United States Patent
O'Hara et al.

(10) Patent No.: US 6,956,562 B1
(45) Date of Patent: Oct. 18, 2005

(54) METHOD FOR CONTROLLING A HANDHELD COMPUTER BY ENTERING COMMANDS ONTO A DISPLAYED FEATURE OF THE HANDHELD COMPUTER

(75) Inventors: Sean O'Hara, Foster City, CA (US); Gary Responte, Fremont, CA (US); Lauren Utigard, Pleasanton, CA (US); Joe Tate, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 09/574,720

(22) Filed: May 18, 2000

Related U.S. Application Data

(60) Provisional application No. 60/204,876, filed on May 16, 2000.

(51) Int. Cl.$^7$ ............................. G09G 5/00; G06F 3/00
(52) U.S. Cl. ..................... 345/173; 345/173; 715/864
(58) Field of Search ............................. 345/173, 506, 345/526, 502, 178, 156, 157, 158, 863, 179, 519, 507, 524, 864; 365/230.05; 364/708.1; 361/683, 686; 312/223.2; 715/864

(56) References Cited

U.S. PATENT DOCUMENTS

| | | | | |
|---|---|---|---|---|
| 5,528,743 A | * | 6/1996 | Tou et al. ................... | 715/541 |
| 5,805,474 A | * | 9/1998 | Danielson et al. ........... | 361/683 |
| 5,815,165 A | * | 9/1998 | Blixt ........................... | 345/506 |
| 5,838,337 A | * | 11/1998 | Kimura et al. .............. | 345/505 |
| 6,011,546 A | * | 1/2000 | Bertram ...................... | 345/700 |
| 6,097,374 A | * | 8/2000 | Howard ....................... | 345/168 |
| 6,226,739 B1 | * | 5/2001 | Eagle ............................ | 713/1 |
| 6,337,681 B1 | * | 1/2002 | Martin .................... | 178/18.03 |
| 6,388,877 B1 | * | 5/2002 | Canova et al. ........... | 312/223.2 |
| 6,459,442 B1 | * | 10/2002 | Edwards et al. ............ | 345/863 |
| 6,462,760 B1 | * | 10/2002 | Cox et al. .................... | 345/835 |
| 6,476,834 B1 | * | 11/2002 | Doval et al. ................. | 345/863 |
| 6,496,284 B1 | * | 12/2002 | Dow et al. ................... | 358/473 |

* cited by examiner

Primary Examiner—Alexander Eisen

(57) ABSTRACT

A method for software control using a user-interactive display screen feature is disclosed that reduces stylus or other manipulations necessary to invoke software functionality from the display screen. According to the method, a graphical feature having a surface area is displayed on a touch-sensitive screen. The touch-sensitive screen is coupled to at least one processor and the graphical feature is generated by an operating system and uniquely associated with a particular software program by the operating system. To control software executing on the processor, a user-supplied writing on the surface area is received and the software is controlled responsive to the writing. In alternate embodiments, the method further controls data stored in a memory device responsive to the writing or further controls transmission of data from a radiation emitter, which may be coupled to voice and data networks.

66 Claims, 4 Drawing Sheets

METHOD FOR CONTROLLING A HANDHELD COMPUTER BY ENTERING COMMANDS ONTO A DISPLAYED FEATURE OF THE HANDHELD COMPUTER

CROSS-REFERENCE TO RELATED APPLICATION

This application claims priority to U.S. provisional application Ser. No. 60/204,876 filed May 16, 2000 entitled "METHOD FOR SOFTWARE CONTROL USING A USER-INTERACTIVE COMPUTER ICON" which is fully incorporated herein by reference.

FIELD OF THE INVENTION

This invention relates to handheld computers in general and to iconography for hand-held computers in particular.

DESCRIPTION OF RELATED ART

Engineering hand-held computers poses special problems in comparison to desk-top or lap-top computer design. One problem relates to combining device functionality and convenience with an inherently small display size. In contrast to desk top or lap top computers having displays comparable in size with a standard sheet of paper, a hand-held computer inherently has a display about the size of the palm of a human hand. Since the display space is limited to be considerably smaller than that of other computers, the amount of surface area allocated to graphical features providing functional control is a design consideration.

Typically, a hand-held computer user selects a menu icon on a display screen with a stylus and opens a menu of control options that occupies an area of the display screen. Then, the user must drag the stylus to a subsequent selection within the menu display or otherwise proceed through an array of displayed choices by manipulating the stylus or keys or buttons on the computer's face. Often, the user must pass through several levels of choices and perform attendant manipulations to arrive at the desired functionality. This is needlessly complicated and frustrating to the user. Related methods using a dedicated writing, or "graffiti," area of a touch sensitive screen are an improvement. However, by having a dedicated area for general writing input, an association of the writing input to particular aspects of software is not immediate.

SUMMARY OF THE INVENTION

This invention is a method for software control using a user-interactive display screen feature. According to the method, a graphical feature having a surface area is displayed on a touch-sensitive screen. The touch-sensitive screen is coupled to at least one processor and the graphical feature is generated by an operating system and uniquely associated with a particular software program by the operating system. To control software executing on the processor, a user-supplied writing on the surface area is received and the software is controlled responsive to the writing. In alternate embodiments, the method further controls data stored in a memory device responsive to the writing or further controls transmission of data from a radiation emitter, which may be coupled to voice and data networks.

In one embodiment, the writing is a sequence of impulses applied to the touch-sensitive screen. In other embodiments, the writing comprises at least one character of an alphabet or simple shapes such as circles or polygons. Software commencement and cessation, logical decisions, and graphical presentation are non-limiting examples of control that may be accomplished by the method.

DETAILED DESCRIPTION

Figure 1:
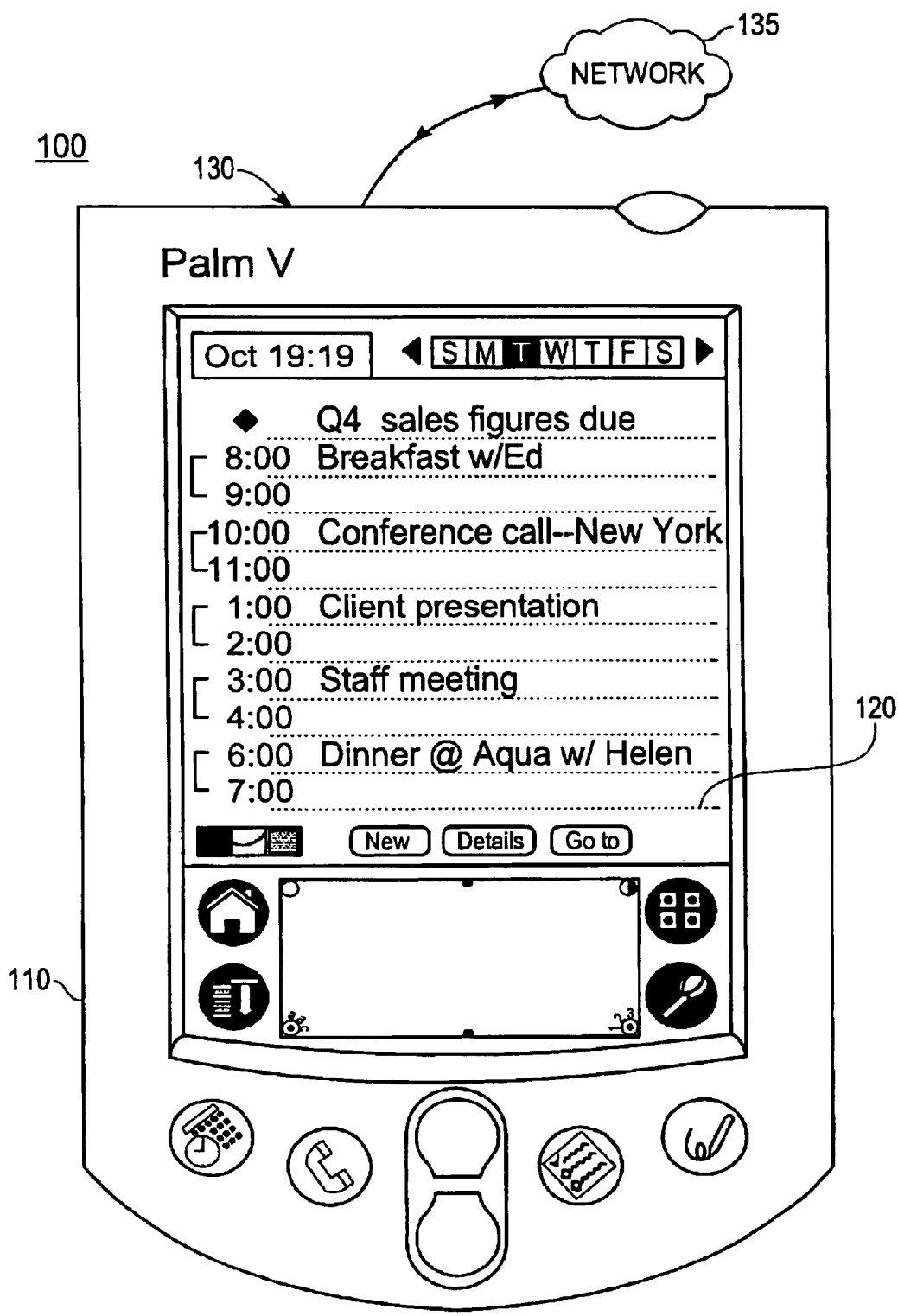
FIG. 1 illustrates a hand-held computer.

FIG. 1 illustrates a hand-held computer 100 for use with an embodiment of this invention. In FIG. 1, housing 110, touch-sensitive screen 120, radiation emitter 130 and network 135 are shown. At least one processor and storage memory device are within the housing and not shown. Examples of handheld computers include PALM III™, PALM V™ and PALM VII™ organizers, manufactured by PALM, Inc. Other examples include devices operating a Windows CE™ or pocket windows™ operating system. Still further, handheld computers may include cell-phones and other network-enabled devices.

The characteristics of suitable touch-sensitive screens, radiation emitters, processors and storage memory devices are well known in the art. In different embodiments, the radiation emitter may be an optical radiation emitter, or a radio frequency radiation emitter, or a microwave radiation emitter. In a preferred embodiment, the storage memory device is a non-volatile memory device. A volatile memory device may also be provided.

Network 135 may be digital or analog, or a voice network such as a cellular phone network or a data network such as the Internet. Alternate networks include local area and wide area networks. From FIG. 1, a user may interact with hand-held computer 100 through touch-sensitive screen 120. Radiation emitter 130 couples the computer to network 135. Embodiments of the computer may also include a radiation receiver (not shown) for two-way communication with the network. Suitable radiation receivers are also well known.

Figure 2:
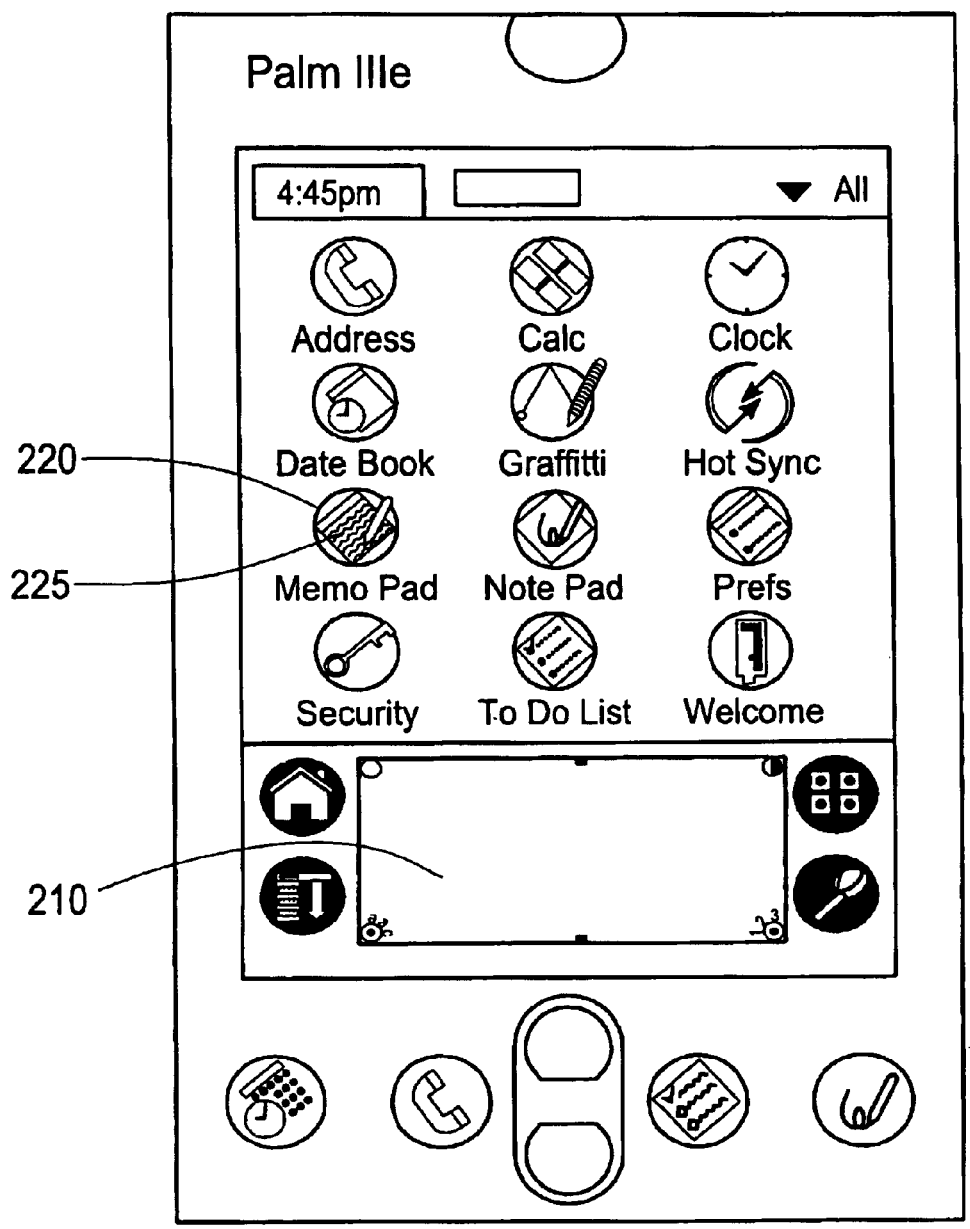
FIG. 2 illustrates one embodiment of a display.

FIG. 2 illustrates one embodiment of a display for hand-held computer 100. In FIG. 2, touch-sensitive screen 120, writing area 210, user-interactive feature 220 and feature surface area 225 are shown. For the embodiment in FIG. 2, the location of the writing area is fixed on the screen and is a general input area, not associated with particular software by the computer operating system. The writing area may be a Graffitti™ input feature, such as used by handheld computers using a PALM operating system.

In an embodiment, the user-interactive feature 220 is programmatically controlled to appear at any particular location of the screen by an operating system. The user-interactive feature may also be associated with a particular software program by the operating system. An example of a user-interactive feature is an icon. Other examples are menus and check fields. The user-interactive feature may be state-selecting, so as to select, for example, between unactuated and actuated states.

Figure 3:
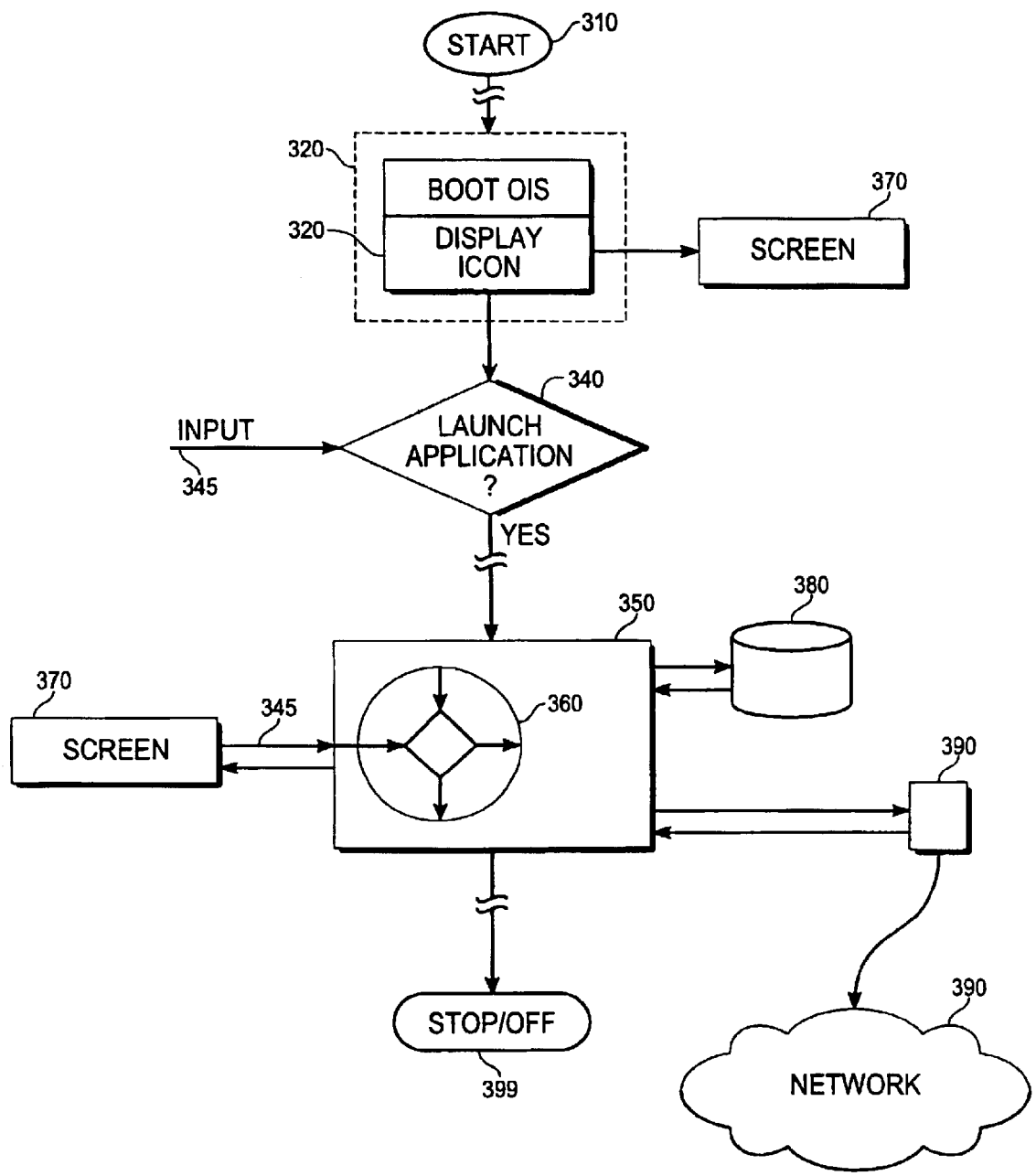
FIG. 3 shows a flow chart of one embodiment of the method.

FIG. 3 shows a flow chart of one embodiment of the invention. In FIG. 3, user-inputs 345 control software including software application program 350. The software application may be in two-way communication with hardware units such as touch-sensitive screen 370, memory 385 and radiation transmitter 390. The transmitter is in communication with network 395. As is obvious to one skilled in the art, a computer system may consist of other hardware and software in addition to, or instead of, that shown in FIG. 3 without departing from the invention.

In FIG. 3, a system starts at block 310 by displaying a user-interface. The user-interface includes a graphical user-interactive feature such as an icon on screen 370 (see block 330). According to the invention, the graphical user-interactive feature is generated by the operating system and uniquely associated with a particular software application program 350 by the operating system.

User input 345 from the interactive feature may open or reconfigure the software application associated with the user-interactive feature at block 340. User input may also control logical decisions within the software application at block 360 or cause cessation of the software application at block 399.

Interaction between the user and the graphical feature or icon displayed on the touch-sensitive screen includes writing on a surface area of the feature. Writing includes a sequence of impulses, or taps, applied to an area that is less than or equal to the surface area of the graphical feature. According to the invention, writing also includes characters of an alphabet or numbers or simple shapes such as circles or polygons. Combinations of all of the foregoing types of writing are also possible.

In an embodiment, the writing is momentarily apparent on the display, before the user input is acted on by handheld computer 100. Preferably, the writing on the icon causes an action that is different than activating the icon. For example, the icon may be activated through a single-tap, applied to a region of screen 370 where the icon is being displayed. In contrast, the writing is a gesture applied on the region of the screen 370 that is not a single-tap.

Logical decisions determined at least in part by input from the graphical user-interactive feature may determine input/output communication with hardware devices such as touch-sensitive screen 370, memory 380 and radiation emitter 390. In this embodiment, the input/output communication with the screen, including the writing on the user-interactive feature may present additional graphics to the user, including graphics indicating additional user-selectable software options. The input/output communication with the memory controls data stored in the memory, which includes deleting or altering data in memory. The input/output communication with the radiation emitter controls transmission of information to network 395. Alternate embodiments may include a radiation detector for two-way communication with the network.

Writing on the user-interactive feature may alter data stored in memory. A preferred memory 380 is non-volatile, but may also be volatile. Alternate embodiments include interaction between a processor and a random access memory (RAM) and read only memory (ROM). A preferred type of memory is operated by control of electric fields within a semiconductor. However, alternate embodiments include magnetic or optical memory devices. Radiation emitter 390 may be an optical radiation emitter or a radio frequency radiation emitter or a microwave frequency radiation emitter. Network 395 may be a digital or analog network for voice or data and may be a local area or a wide area network.

Figure 4:
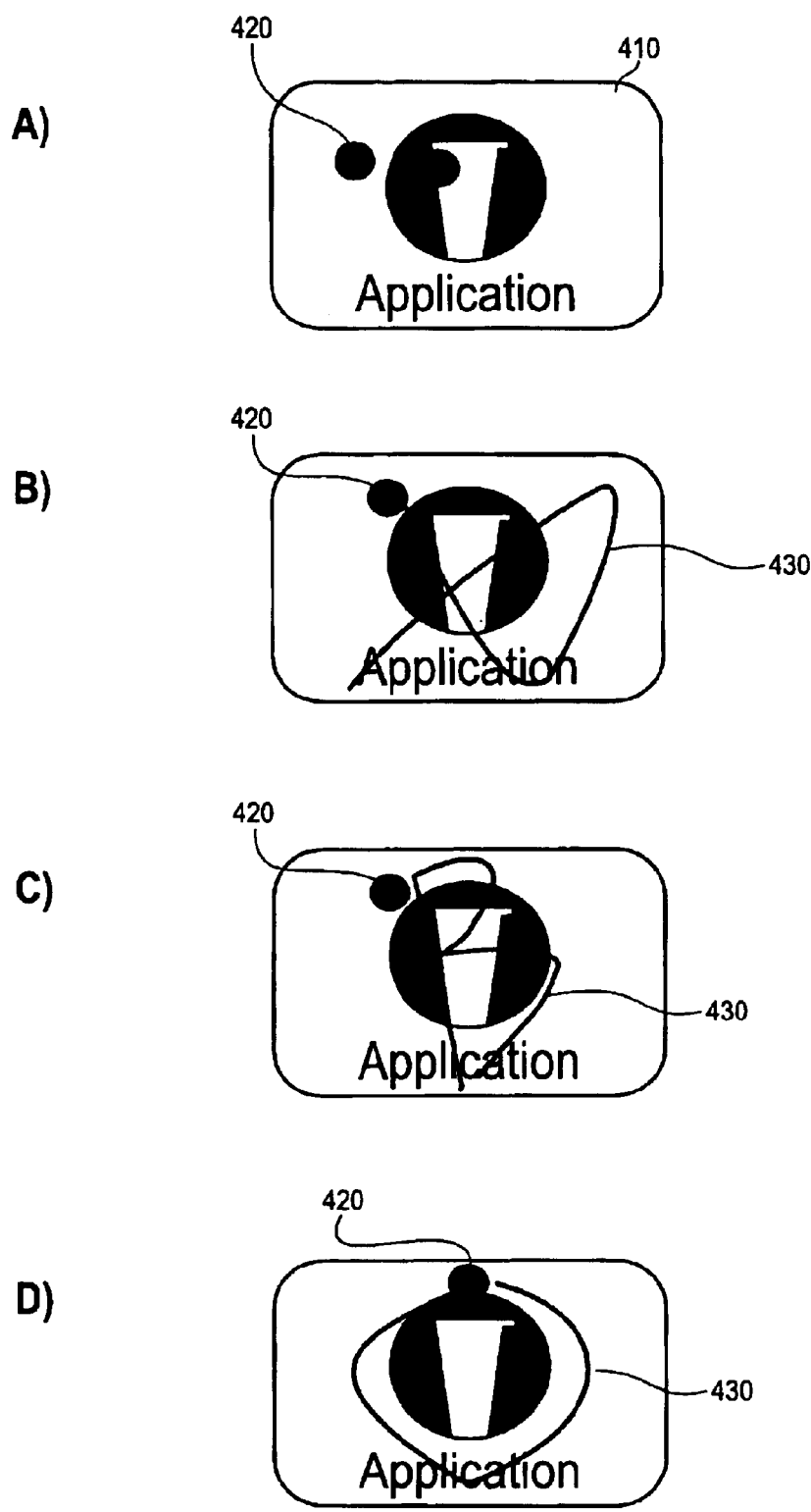
FIGS. 4A–4D illustrate an embodiment of a user-interactive feature and exemplary writings.

FIGS. 4A–4D further illustrate an embodiment of a user-interactive feature and exemplary writings. In FIGS. 4A–4D, user-interactive feature surface area 410, stylus tap marks 420 and other writings 430 are shown. In FIG. 4A, a single stylus tap commences or launches the software application associated with the user-interactive feature and a double tap presents other options for the application on display 370 (see FIG. 3). In FIG. 4B, writing an "x" over the user-interactive feature deletes the application from memory 380 (see FIG. 3). In FIG. 4C, writing a "b" over the user-interactive feature transmits, or beams, the application from radiation emitter 390. In FIG. 4D, writing an "o" over the user-interactive feature presents other options for the application on display 370.

The foregoing description of various embodiments of the invention has been presented for purposes of illustration and description. It is not intended to limit the invention to the precise forms disclosed. Many modifications and equivalent arrangements will be apparent.

What is claimed is:

1. A method for software control, comprising:

displaying a graphic representing a set of one or more computer functions on a portion of a touch-sensitive screen, wherein the touch-sensitive screen is coupled to at least one processor to detect and interpret contact with the screen;

detecting an object making a first sequence of one or more contacts that form a first drawing on the portion of the screen;

in response to detecting the object making the first sequence of one or more contacts that form the first drawing:

matching the first sequence to a particular action in a set of actions, and performing the particular action;

detecting an object making a second sequence of one or more contacts to form a second drawing on the portion of the screen;

in response to detecting the object making the second sequence of one or more contacts to form the second drawing:

matching the second sequence to a second action in a set of actions related to said one or more computer functions, and performing the second action;

wherein the visual appearance of the graphic is the same when the first sequence of contacts is commenced and when the second sequence of contacts is commenced.

2. The method of claim 1, wherein the first sequence of contacts and the second sequence of contacts are applied within an area that is smaller than an area of the graphic.

3. A computer-readable medium carrying one or more sequences of instructions which, when executed by one or more processors, causes the one or more processors to perform the method recited in claim 2.

4. The method of claim 1, wherein the first drawing is an alphabet character.

5. A computer-readable medium carrying one or more sequences of instructions which, when executed by one or more processors, causes the one or more processors to perform the method recited in claim 4.

6. The method of claim 1, wherein the first drawing is in a circular form.

7. A computer-readable medium carrying one or more sequences of instructions which, when executed by one or more processors, causes the one or more processors to perform the method recited in claim 6.

8. The method of claim 1, wherein the first drawing is in a polygonal form.

9. A computer-readable medium carrying one or more sequences of instructions which, when executed by one or more processors, causes the one or more processors to perform the method recited in claim 8.

10. The method of claim 1, wherein:
   performing the particular action includes presenting a set of graphics to the user on the screen; and
   the graphics provide a plurality of user-selectable software options.

11. A computer-readable medium carrying one or more sequences of instructions which, when executed by one or more processors, causes the one or more processors to perform the method recited in claim 10.

12. The method of claim 1, wherein the particular action corresponds to transmitting data by generating a signal emanating from a radiation emitter.

13. A computer-readable medium carrying one or more sequences of instructions which, when executed by one or more processors, causes the one or more processors to perform the method recited in claim 12.

14. The method of claim 12, wherein the radiation emitter is an optical radiation emitter.

15. A computer-readable medium carrying one or more sequences of instructions which, when executed by one or more processors, causes the one or more processors to perform the method recited in claim 14.

16. The method of claim 12, wherein the radiation emitter is a radio frequency radiation emitter.

17. A computer-readable medium carrying one or more sequences of instructions which, when executed by one or more processors, causes the one or more processors to perform the method recited in claim 16.

18. The method of claim 16, wherein the radiation emitter is coupled to a computer network.

19. A computer-readable medium carrying one or more sequences of instructions which, when executed by one or more processors, causes the one or more processors to perform the method recited in claim 18.

20. The method of claim 16, wherein the radiation emitter is coupled to a telephone network.

21. A computer-readable medium carrying one or more sequences of instructions which, when executed by one or more processors, causes the one or more processors to perform the method recited in claim 20.

22. The method of claim 12, wherein the radiation emitter is an microwave radiation emitter.

23. A computer-readable medium carrying one or more sequences of instructions which, when executed by one or more processors, causes the one or more processors to perform the method recited in claim 22.

24. The method of claim 22, wherein the radiation emitter is coupled to a computer network.

25. A computer-readable medium carrying one or more sequences of instructions which, when executed by one or more processors, causes the one or more processors to perform the method recited in claim 24.

26. The method of claim 22, wherein the radiation emitter is coupled to a telephone network.

27. A computer-readable medium carrying one or more sequences of instructions which, when executed by one or more processors, causes the one or more processors to perform the method recited in claim 26.

28. The method of claim 1, wherein performing the particular action includes performing an operating system function.

29. A computer-readable medium carrying one or more sequences of instructions which, when executed by one or more processors, causes the one or more processors to perform the method recited in claim 28.

30. The method of claim 28, wherein performing an operating system function includes deleting one or more software applications from a memory of a computer.

31. A computer-readable medium carrying one or more sequences of instructions which, when executed by one or more processors, causes the one or more processors to perform the method recited in claim 30.

32. The method of claim 30, wherein deleting one or more software applications from a memory includes deleting the software applications from a non-volatile storage memory.

33. A computer-readable medium carrying one or more sequences of instructions which, when executed by one or more processors, causes the one or more processors to perform the method recited in claim 32.

34. The method of claim 30, wherein deleting one or more software applications from a memory includes deleting the software applications from a random access memory.

35. A computer-readable medium carrying one or more sequences of instructions which, when executed by one or more processors, causes the one or more processors to perform the method recited in claim 34.

36. The method of claim 30, wherein deleting one or more software applications from a memory includes deleting the software applications from a memory that is readable by a magnetic memory reader.

37. A computer-readable medium carrying one or more sequences of instructions which, when executed by one or more processors, causes the one or more processors to perform the method recited in claim 36.

38. The method of claim 30, wherein deleting one or more software applications from a memory includes deleting the software applications from a memory that is readable by an optical memory reader.

39. A computer-readable medium carrying one or more sequences of instructions which, when executed by one or more processors, causes the one or more processors to perform the method recited in claim 38.

40. The method of claim 1, wherein displaying a graphic includes displaying a computer-generated icon on the screen.

41. A computer-readable medium carrying one or more sequences of instructions which, when executed by one or more processors, causes the one or more processors to perform the method recited in claim 40.

42. The method of claim 1, wherein displaying a graphic includes permanently displaying the graphic on the screen.

43. A computer-readable medium carrying one or more sequences of instructions which, when executed by one or more processors, causes the one or more processors to perform the method recited in claim 42.

44. The method of claim 1, wherein performing the particular action includes interpreting the first sequence as a selection to launch one of a plurality of applications on the handheld computer.

45. A computer-readable medium carrying one or more sequences of instructions which, when executed by one or more processors, causes the one or more processors to perform the method recited in claim 44.

46. A computer-readable medium carrying one or more sequences of instructions which, when executed by one or more processors, causes the one or more processors to perform the method recited in claim 1.

47. A handheld computer comprising:
   displaying a graphic representing a set of one or more computer functions on a portion of a touch-sensitive screen, wherein the touch-sensitive screen is coupled to at least one processor to detect and interpret contact with the screen;

detecting an object making a first sequence of one or more contacts that form a first drawing on the portion of the screen;

in response to detecting the object making the first sequence of one or more contacts that form the first drawing:

matching the first sequence to a particular action in a set of actions, and performing the particular action;

detecting an object making a second sequence of one or more contacts to form a second drawing on the portion of the screen;

in response to detecting the object making the second sequence of one or more contacts to form the second drawing:

matching the second sequence to a second action in a set of actions related to said one or more computer functions, and performing the second action;

wherein the visual appearance of the graphic is the same when the first sequence of contacts is commenced and when the second sequence of contacts is commenced.

48. The handheld computer of claim 47, wherein the first sequence of contacts is applied within an area that is smaller than an area of the graphic.

49. The handheld computer of claim 47, wherein the first drawing is an alphabet character.

50. The handheld computer of claim 47, wherein the first drawing is in a circular form.

51. The handheld computer of claims 47, wherein the first drawing is in a polygonal form.

52. The handheld computer of claim 47, wherein:

performing the particular action includes presenting a set of graphics to the user on the screen; and the graphics provide a plurality of user-selectable software options.

53. The handheld computer of claim 47, wherein the particular action corresponds to transmitting data by generating a signal emanating from a radiation emitter.

54. The handheld computer of claim 53, wherein the radiation emitter is an optical radiation emitter.

55. The handheld computer of claim 53, wherein the radiation emitter is a radio frequency radiation emitter.

56. The handheld computer of claim 53, wherein the radiation emitter is an microwave radiation emitter.

57. The handheld computer of claim 56, wherein the radiation emitter is coupled to a telephone network.

58. The handheld computer of claim 56, wherein the radiation emitter is coupled to a computer network.

59. The handheld computer of claim 53, wherein the radiation emitter is coupled to a computer network.

60. The handheld computer of claim 53, wherein the radiation emitter is coupled to a telephone network.

61. The handheld computer of claim 47, wherein performing the particular action includes performing an operating system function.

62. The handheld computer of claim 61, wherein performing an operating system function includes deleting one or more software applications from a memory of the handheld computer.

63. The handheld computer of claim 62, wherein deleting one or more software applications from a memory includes deleting the software applications from a non-volatile storage memory.

64. The handheld computer of claim 62, wherein deleting one or more software applications from a memory includes deleting the software applications from a random access memory.

65. The handheld computer of claim 62, wherein deleting one or more software applications from a memory includes deleting the software applications from a memory that is readable by a magnetic memory reader.

66. The handheld computer of claim 62, wherein deleting one or more software applications from a memory includes deleting the software applications from a memory that is readable by an optical memory reader.

* * * * *

UNITED STATES PATENT AND TRADEMARK OFFICE
CERTIFICATE OF CORRECTION

PATENT NO. : 6,956,562 B2
APPLICATION NO. : 09/574720
DATED : October 18, 2005
INVENTOR(S) : O'Hara et al.

It is certified that error appears in the above-identified patent and that said Letters Patent is hereby corrected as shown below:

In the Claims:

Claim 47, column 6, line 63, "A handheld computer comprising:" should read -- A handheld computer configured for: --.

Signed and Sealed this

Third Day of October, 2006

JON W. DUDAS
*Director of the United States Patent and Trademark Office*

(12) INTER PARTES REEXAMINATION CERTIFICATE (1113th)
United States Patent
O'Hara et al.

(10) Number: US 6,956,562 C1
(45) Certificate Issued: May 21, 2015

(54) METHOD FOR CONTROLLING A HANDHELD COMPUTER BY ENTERING COMMANDS ONTO A DISPLAYED FEATURE OF THE HANDHELD COMPUTER

(75) Inventors: Sean O'Hara, Foster City, CA (US); Gary Responte, Fremont, CA (US); Lauren Utigard, Pleasanton, CA (US); Joe Tate, San Jose, CA (US)

(73) Assignee: ACCESS CO., LTD., Saragaku-Cho, Chiyoda-Ku, Tokyo (JP)

Reexamination Request:
No. 95/002,302, Sep. 14, 2012

Reexamination Certificate for:
Patent No.: 6,956,562
Issued: Oct. 18, 2005
Appl. No.: 09/574,720
Filed: May 18, 2000

Certificate of Correction issued Oct. 3, 2006

Related U.S. Application Data

(60) Provisional application No. 60/024,876, filed on May 16, 2000.

(51) Int. Cl.
*G09G 5/00* (2006.01)
*G06F 3/00* (2006.01)
*G06F 3/0488* (2013.01)
*G06F 3/0489* (2013.01)

(52) U.S. Cl.
CPC ........ *G06F 3/04883* (2013.01); *G06F 3/04892* (2013.01)

(58) Field of Classification Search
None
See application file for complete search history.

(56) References Cited

To view the complete listing of prior art documents cited during the proceeding for Reexamination Control Number 95/002,302, please refer to the USPTO's public Patent Application Information Retrieval (PAIR) system under the Display References tab.

*Primary Examiner* — Joseph R Pokrzywa

(57) ABSTRACT

A method for software control using a user-interactive display screen feature is disclosed that reduces stylus or other manipulations necessary to invoke software functionality from the display screen. According to the method, a graphical feature having a surface area is displayed on a touch-sensitive screen. The touch-sensitive screen is coupled to at least one processor and the graphical feature is generated by an operating system and uniquely associated with a particular software program by the operating system. To control software executing on the processor, a user-supplied writing on the surface area is received and the software is controlled responsive to the writing. In alternate embodiments, the method further controls data stored in a memory device responsive to the writing or further controls transmission of data from a radiation emitter, which may be coupled to voice and data networks.

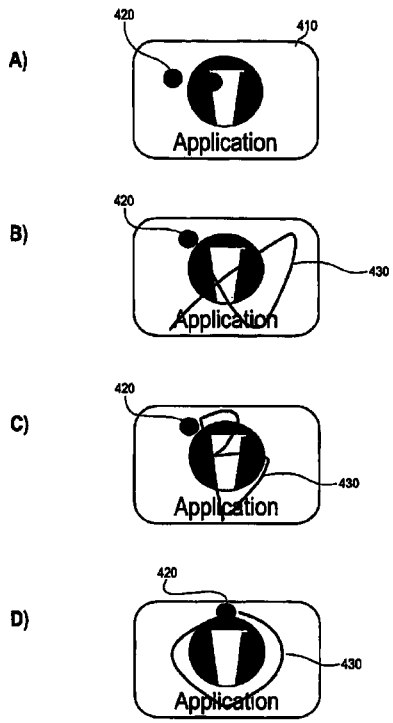

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-21, 28-35, 40-55 and 59-64 are cancelled.

Claims 22-27, 36-39, 56-58, 65 and 66 were not reexamined.

* * * * *